US012567079B2

(12) United States Patent
Kunwar et al.

(10) Patent No.: US 12,567,079 B2
(45) Date of Patent: Mar. 3, 2026

(54) MACHINE-LEARNING (ML)-BASED SYSTEM AND METHOD FOR GENERATING DSO IMPACT SCORE FOR FINANCIAL TRANSACTION

(71) Applicant: HIGHRADIUS CORPORATION, Houston, TX (US)

(72) Inventors: Anupam Kunwar, Hyderabad (IN); Glen George, Hyderabad (IN); Apoorva Shrivastava, Hyderabad (IN); Sayanta Mukherjee, Hyderabad (IN); Shailly Shailja, Hyderabad (IN)

(73) Assignee: HIGHRADIUS CORPORATION, TX (US)

( * ) Notice: Subject to any disclaimer, the term of this patent is extended or adjusted under 35 U.S.C. 154(b) by 344 days.

(21) Appl. No.: 18/306,278

(22) Filed: Apr. 25, 2023

(65) Prior Publication Data

US 2023/0342793 A1      Oct. 26, 2023

Related U.S. Application Data

(60) Provisional application No. 63/334,472, filed on Apr. 25, 2022.

(51) Int. Cl.
| | |
|---|---|
| *G06Q 30/0201* | (2023.01) |
| *G06Q 10/0635* | (2023.01) |
| *G06Q 20/10* | (2012.01) |
| *G06Q 30/0204* | (2023.01) |
| *G06Q 30/04* | (2012.01) |
| *G06Q 40/03* | (2023.01) |

(52) U.S. Cl.
CPC ..... *G06Q 30/0201* (2013.01); *G06Q 10/0635* (2013.01); *G06Q 20/102* (2013.01); *G06Q 30/0204* (2013.01); *G06Q 30/04* (2013.01); *G06Q 40/03* (2023.01)

(58) Field of Classification Search
None
See application file for complete search history.

(56) References Cited

U.S. PATENT DOCUMENTS 11,410,181 B2 * 8/2022 Shah .................... G06Q 20/102
11,521,214 B1 * 12/2022 Hetrick ............... G06Q 10/107
(Continued)

*Primary Examiner* — Jamie H Austin
(74) *Attorney, Agent, or Firm* — Jason C. Cameron

(57)      ABSTRACT

A Machine Learning (ML)-based computing system and method for financial transaction based customer worklist generation is disclosed. A data determination module configured to obtain a credit sale amount, an account receivable as of a run date of the module (RD), a disputed invoice amount and a skipped invoice amount using an Machine Learning (ML) model. A DSO component calculation module configured to calculate the obtained DSO components for each entity corresponding to a grouping category at a given point of time period. A DSO impact score generation module configured to generate a DSO impact score based on the estimated open amount reduction, desired number of days in period and the credit sale amount. A Machine Learning insight module configured to calculate the generated DSO impact score based on historical customer information associated with one or more customers. A data output module configured to output the DSO impact score.

14 Claims, 5 Drawing Sheets

(56) References Cited

U.S. PATENT DOCUMENTS

| | | | |
|---|---|---|---|
| 2009/0157440 A1* | 6/2009 | Stone | G06Q 20/20 |
| | | | 705/16 |
| 2014/0172659 A1* | 6/2014 | Kennedy | G06Q 40/02 |
| | | | 705/35 |
| 2017/0124631 A1* | 5/2017 | Bhandari | G06Q 30/0633 |
| 2018/0357714 A1* | 12/2018 | So | G06N 5/022 |
| 2020/0098055 A1* | 3/2020 | O'Hara | G06Q 30/0202 |
| 2020/0143348 A1* | 5/2020 | Collares | G06N 3/08 |
| 2022/0318897 A1* | 10/2022 | Brunelle, III | G06Q 40/02 |
| 2023/0004590 A1* | 1/2023 | Li | G06N 7/01 |
| 2023/0342793 A1* | 10/2023 | Kunwar | G06Q 40/03 |

* cited by examiner

300

| customer number | Credit Sales | AsIs DSO Impact in 7 days | Improved DSO Impact in 7 days | Customer DSO Impact | Account DSO Impact | Open && Exp Within 7 days | Open && Exp Within 14 days | Open && Exp Within 21 days | InvPastDue && NotDisputed && NotSkipped && ExpDate <= RD + 7 | InvPastDue && NotDisputed && NotSkipped && ExpDate < RD + 7 | Skipped Invoice | Open && Due Within 7 days | Open && Due With in 14 days | Open && Due With in 21 days |
|---|---|---|---|---|---|---|---|---|---|---|---|---|---|---|
| | $1.5 B | $136.4 M | $204.6 M | 4.44 | | $136.4 M | $246.0 M | $299.4 M | $63.5 M | $588.4 K | $60.2 M | $131.4 M | $254.3 M | $286.5 M |
| | | | | | | 8.41 | 15.16 | 18.46 | 4.10 | 0.03 | 0.38 | 8.10 | 14.44 | 17.29 |
| 450009935 | $163.0 M | $14.0 M | $22.9 M | 5.00 | 0.55 | $14.0 M | $30.6 M | $43.3 M | $7.8 M | $0.0 K | $166.0 K | $15.0 M | $31.4 M | $43.8 M |
| 450009935 | $127.1 M | $11.1 M | $26.1 M | 9.29 | 0.86 | $11.1 M | $21.7 M | $35.6 M | $13.3 M | $0.0 K | $433.8 K | $11.8 M | $25.6 M | $36.6 M |
| 450009583 | $114.8 M | $11.1 M | $11.1 M | 0.00 | 0.00 | $11.1 M | $20.9 M | $30.9 M | $1.2 M | $0.0 K | $3.0 K | $11.1 M | $20.9 M | $30.9 M |
| 450009262 | $86.6 M | $7.2 M | $10.3 M | 2.68 | 0.18 | $7.7 M | $12.5 M | $12.5 M | $2.2 M | $0.0 K | $388.9 K | $7.7 M | $12.5 M | $12.5 M |
| 450009928 | $75.3 M | $6.7 M | $9.4 M | 3.32 | 0.17 | $6.7 M | $11.0 M | $11.0 M | $2.6 M | $0.0 K | $122.5 K | $6.7 M | $11.0 M | $11.0 M |
| 450009717 | $71.9 M | $5.5 M | $12.3 M | 8.53 | 0.42 | $5.5 M | $11.9 M | $15.7 M | $5.5 M | $0.0 K | $489.7 K | $6.4 M | $11.3 M | $11.3 M |
| 450009726 | $59.1 M | $5.2 M | $7.1 M | 3.02 | 0.12 | $5.2 M | $10.6 M | $10.6 M | $1.9 M | $0.0 K | $442.2 K | $5.2 M | $10.6 M | $11.6 M |
| 450009725 | $57.8 M | $5.7 M | $9.1 M | 5.33 | 0.21 | $5.7 M | $10.7 M | $11.6 M | $3.1 M | $0.0 K | $285.9 K | $5.7 M | $6.8 M | $8.8 M |
| 450009198 | $38.7 M | $3.8 M | $4.6 M | 1.82 | 0.05 | $3.8 M | $7.0 M | $10.7 M | $860.4 K | $0.0 K | $3.1 K | $3.8 M | $7.0 M | $10.7 M |
| 450009820 | $33.4 M | $3.3 M | $4.2 M | 2.45 | 0.08 | $3.3 M | $5.0 M | $5.0 M | $785.2 K | $0.0 K | $113.4 K | $3.3 M | $5.0 M | $5.0 M |
| 450007815 | $32.5 M | $4.0 M | $5.0 M | 2.79 | 0.08 | $4.0 M | $7.0 M | $9.2 M | $1.1 M | $0.0 K | $350.1 K | $3.5 M | $7.0 M | $8.1 M |
| 450009935 | $30.2 M | $2.5 M | $1.1 M | 0.00 | 0.00 | $2.5 M | $5.7 M | $6.5 M | $0.0 M | $0.0 K | $0.3 K | $0.7 M | $1.8 M | $3.9 M |
| 450009515 | $28.8 M | $2.4 M | $2.6 M | 0.72 | 0.01 | $2.4 M | $5.0 M | $5.0 M | $26.8 K | $0.0 K | $0.0 K | $2.6 M | $4.9 M | $5.6 M |
| 450009637 | $29.3 M | $3.4 M | $4.6 M | 3.86 | 0.07 | $3.4 M | $4.6 M | $4.0 M | $1.6 M | $0.0 K | $18.4 K | $3.0 M | $3.6 M | $3.6 M |
| 450009632 | $27.2 M | $2.3 M | $2.7 M | 1.60 | 0.03 | $2.3 M | $4.0 M | $4.0 M | $469.0 K | $0.0 K | $35.5 K | $2.3 M | $2.0 M | $4.8 M |
| 450009642 | $24.8 M | $2.9 M | $4.1 M | 4.37 | 0.07 | $2.9 M | $3.9 M | $3.9 M | $1.1 M | $0.0 K | $535.5 K | $2.4 M | $2.8 M | $2.8 M |
| 450153232 | $21.1 M | $1.5 M | $2.7 M | 5.15 | 0.07 | $1.5 M | $3.0 M | $3.1 M | $869.4 K | $0.0 K | $122.7 K | $1.7 M | $2.7 M | $2.7 M |
| 450010498 | $20.2 M | $1.8 M | $2.1 M | 1.37 | 0.02 | $1.8 M | $3.2 M | $3.2 M | $304.0 K | $0.0 K | $3.0 K | $1.9 M | $3.2 M | $3.2 M |

FIG. 3

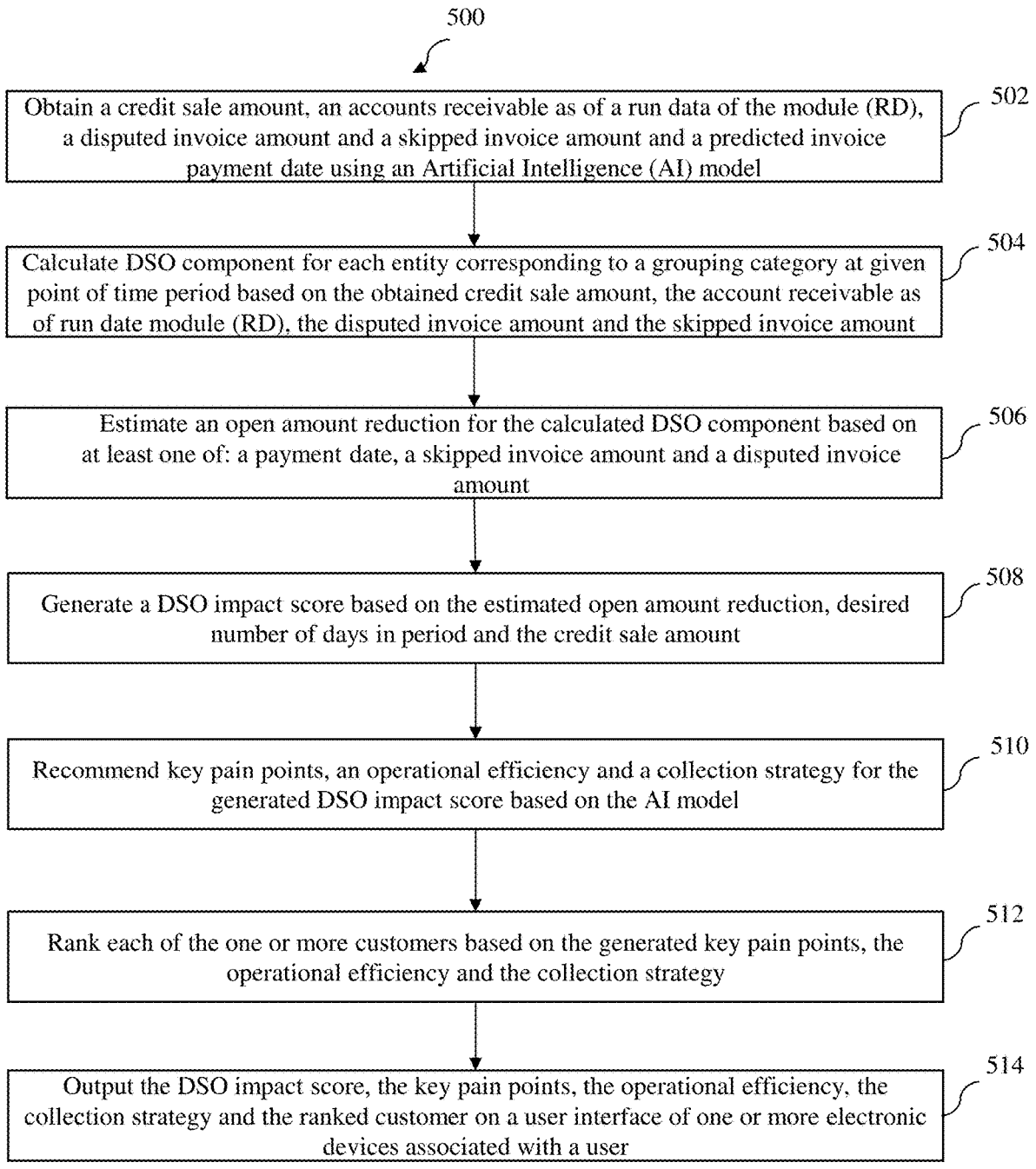

500

Obtain a credit sale amount, an accounts receivable as of a run data of the module (RD), a disputed invoice amount and a skipped invoice amount and a predicted invoice payment date using an Artificial Intelligence (AI) model — 502

Calculate DSO component for each entity corresponding to a grouping category at given point of time period based on the obtained credit sale amount, the account receivable as of run date module (RD), the disputed invoice amount and the skipped invoice amount — 504

Estimate an open amount reduction for the calculated DSO component based on at least one of: a payment date, a skipped invoice amount and a disputed invoice amount — 506

Generate a DSO impact score based on the estimated open amount reduction, desired number of days in period and the credit sale amount — 508

Recommend key pain points, an operational efficiency and a collection strategy for the generated DSO impact score based on the AI model — 510

Rank each of the one or more customers based on the generated key pain points, the operational efficiency and the collection strategy — 512

Output the DSO impact score, the key pain points, the operational efficiency, the collection strategy and the ranked customer on a user interface of one or more electronic devices associated with a user — 514

FIG. 5

MACHINE-LEARNING (ML)-BASED SYSTEM AND METHOD FOR GENERATING DSO IMPACT SCORE FOR FINANCIAL TRANSACTION

CROSS-REFERENCES TO RELATED APPLICATIONS

This application claims priority to U.S. Patent Application Ser. No. 63/334,472 filed on Apr. 25, 2022 by HighRadius Corporation entitled, "SYSTEMS AND METHODS FOR DSO IMPACT FACTOR BASED WORKLIST GENERATION AND VISUALIZATION", the disclosure of which is incorporated herein by reference in its entirety for all purposes.

This disclosure references the co-pending U.S. patent application Ser. No. 18/305,483 filed on Apr. 24, 2023, by HighRadius Corporation entitled. "MACHINE LEARNING (ML)-BASED SYSTEM AND METHOD FOR PREDICTING FINANCIAL TRANSACTION PATTERNS" the disclosure of which is incorporated herein by reference in its entirety for all purposes. The above-listed patent application is relevant to the present invention and provides additional technical information that supports the disclosure contained within this patent application.

FIELD OF INVENTION

Embodiments of the present disclosure relate to Machine Learning (ML)-based processing systems and more particularly relates to a ML-based system and method for generating Days Sales Outstanding (DSO) impact score for financial transactions.

BACKGROUND

Currently, the number of payment transactions in a financial system is increasing rapidly. Manually collecting an open invoice from a customer is a risk task for a collector. A payment behaviour customer segment analysis is not done across all organizations as a part of the collections process of the open invoices. The conventional process of collecting the open invoices has limited insights. Hence, many times core reasons for gaps between the ideal or Best Possible Days Sales Outstanding (BPDSO) and Actual DSOs are not effectively addressed. At a basic level Past due Amounts, type of customers (Large, Medium, Small), payment methods (check, ACH, Direct Debits), volume of disputes, etc. are used as factors to decide segmentation of a customer.

There are also methods where all the past due amounts, type of customers (Large, Medium. Small), payment methods (check, ACH, Direct Debits), volume of disputes factors are assigned a score and based on the cluster of these scores a risk profile is listed to create a customer segment. The created customer segments are then treated to different sets of rules for the collectors to decide on the next steps of the collections process. The conventional methods only employ the highest invoice value first method to ascertain the priority of actions for the collector.

In the conventional methods and systems, a worklist prioritization for the open invoices is not done in an intelligent manner. The conventional methods use minimal insights and foresight to come up with a priority list of the customers. This leads to a lot of wasted manual efforts of the collector's part with no significant improvement in working capital.

Therefore, in order to address the aforementioned issues, there is a need for an improved Machine Learning (ML)-based system and method for processing financial transactions.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a ML-based system for generating Days SalesOutstanding (DSO) Impact score for financial transactions is disclosed. The ML-based computing system and method includes one or more hardware processors and a memory coupled to the one or more hardware processors. The memory includes a plurality of modules in the form of programmable instructions executable by the one or more hardware processors. The plurality of modules include a data determination module configured to obtain a credit sale amount, an account receivable as of the Run date of the module (RD), a disputed invoice amount, skipped invoice amount and Predicted Invoice Payment Date using a Machine Learning based computing system. "Run date" typically refers to the date on which a specific operation is executed. For the purpose of this invention, "run date" refers to the date on which the DSO impact score for financial transactions is generated, and customers are ranked according to the DSO impact score. The plurality of modules include a DSO component calculation module configured to calculate a DSO component for each entity corresponding to a grouping category at given point of time period based on the obtained credit sale amount, the account receivable as of the run date of the module (RD), the disputed invoice amount and the skipped invoice amount. The DSO component calculation module is further configured to estimate an open amount reduction for the calculated DSO component based on at least one of: a payment date, a skipped invoice amount and a disputed invoice amount. The payment date is generated based on historical customer information. The plurality of modules include a DSO impact score generation module configured to generate a DSO impact score based on the estimated open amount reduction, desired number of days in period and the credit sale amount. The plurality of modules include an Machine Learning (ML) insight generation module configured to highlight key pain points, and an operational efficiency for the generated DSO impact score based on the Machine Learning module. The DSO impact score indicates a potential impact on customer level. The Machine Learning (ML) insight generation module is further configured to rank each of the one or more customers based on the generated DSO impact score, highlight key pain points, and operational efficiency. The plurality of modules include a data output module configured to output the DSO impact score, key pain points, the operational efficiency and the ranked customer on a user interface of one or more electronic devices associated with a user.

In accordance with another embodiment of the present disclosure, a ML-based method for generating Days Sales Outstanding (DSO) impact score for financial transactions is disclosed. The method includes obtaining a credit sale amount, an account receivable as of the run date of the module (RD), a disputed invoice amount and a skipped invoice amount using an Machine Learning (ML) model.

The method includes calculating a DSO component for each entity corresponding to a grouping category at a given point of time period based on the obtained credit sale amount, the account receivable as of the run date of the module (RD), the disputed invoice amount and the skipped invoice amount using a ML insights module. The method includes estimating an open amount reduction for the calculated DSO component based on at least one of: a payment date, a skipped invoice amount and a disputed invoice amount. The payment date is generated based on historical customer information. The method includes generating a DSO impact score based on the estimated open amount reduction, desired number of days in period and the credit sale amount. The method includes highlighting key pain points, an operational efficiency and a collection strategy for the generated DSO impact score based on the Machine Learning module. The DSO impact score indicates a potential impact on overall and customer level. The method includes ranking each of the one or more customers based on the generated key pain points, the operational efficiency and the collection strategy. The method includes outputting the DSO impact score, the key pain points, the operational efficiency, the collection strategy and the ranked customer on a user interface of one or more electronic devices associated with a user.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which:

FIG. 3 is an example illustrating a sample customer level grouping process, in accordance with an embodiment of the present disclosure;

FIG. 5 is a flow chart illustrating an exemplary Machine Learning (ML)-based computing method for generating DSO impact score for financial transactions, in accordance with an embodiment of the present disclosure.

Figure 1:
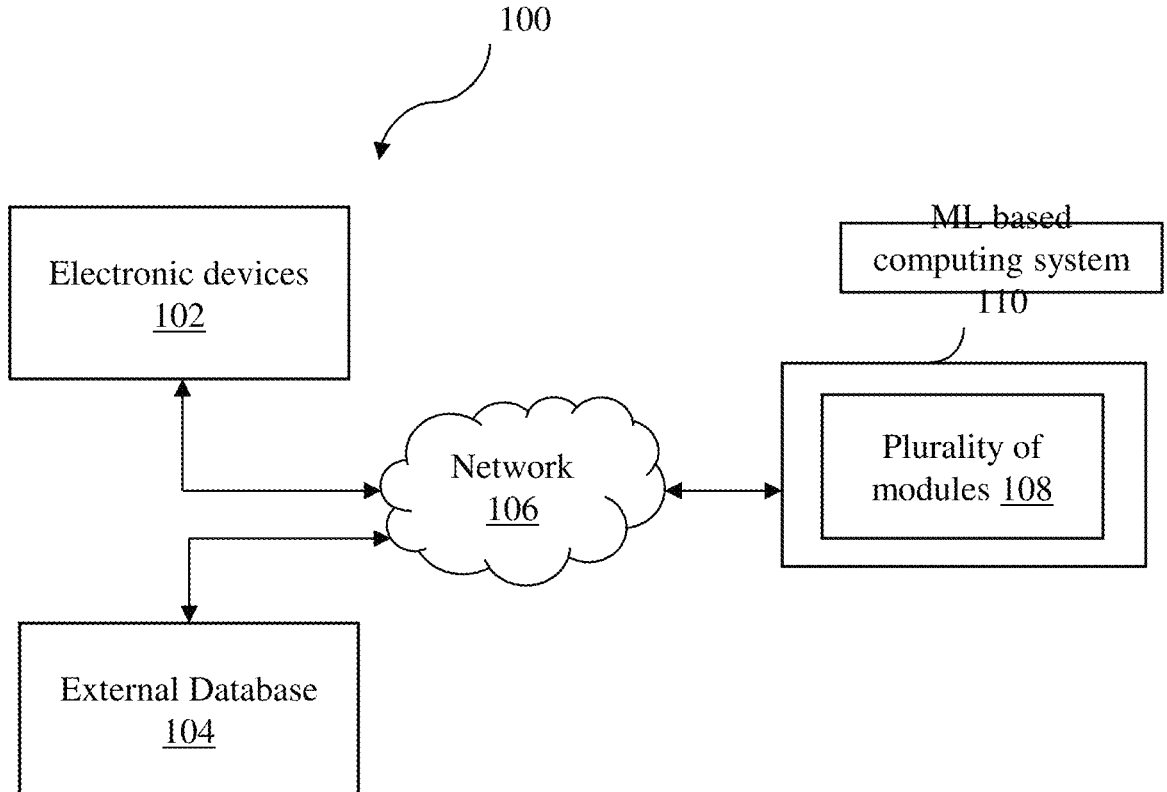
FIG. 1 is a block diagram illustrating an exemplary computing environment for generating DSO impact score for financial transaction, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed, permanently configured (hardwired) or temporarily configured (programmed) to operate in a certain manner and/or to perform certain operations described herein.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates an exemplary computing environment 100 for generating DSO impact score for financial transactions, in accordance with an embodiment of the present disclosure. According to FIG. 1, a computing environment 100 includes one or more electronic devices 102 associated with one or more users. The one or more electronic devices 102 are communicatively coupled to a Machine Learning (ML)-based computing system 110 via a network 106. In an exemplary embodiment of the present disclosure, the one or more users may include one or more analysts, business analysts, cash analysts, financial analysts, and the like. Further, the one or more electronic devices 102 are used by the one or more users for sending one or more open invoices to the ML-based computing system 110 comprising plurality of modules 108. In an exemplary embodiment of the present disclosure, the one or more electronic devices 102 may also be used by the one or more users to receive the one or more open invoices on the user interface screen of the one or more electronic devices 102. The ML-based computing system 110 may be hosted on a central server, such as cloud server or a remote server. Further, the network 106 may be a Wireless-Fidelity (Wi-Fi) connection, a hotspot connection, a Bluetooth connection, a local area network, a wide area network or any other wireless network. In an exemplary embodiment of the present disclosure, the one or more electronic devices 102 may include a laptop computer, desktop computer, tablet computer, smartphone, wearable device, smart watch, and the like.

Further, the computing environment 100 includes an external database 104 communicatively coupled to the ML-based computing system 110 via the network 106.

Furthermore, the one or more electronic devices 102 include a local browser, a mobile application or a combination thereof. Furthermore, the one or more users may use a web application via the local browser, the mobile application or a combination thereof to communicate with the ML-based computing system 110. In an embodiment of the present disclosure, the ML-based computing system 110 includes the plurality of modules 108. Details on the plurality of modules 108 have been elaborated in subsequent paragraphs of the present description with reference to FIG. 2.

Figure 2:
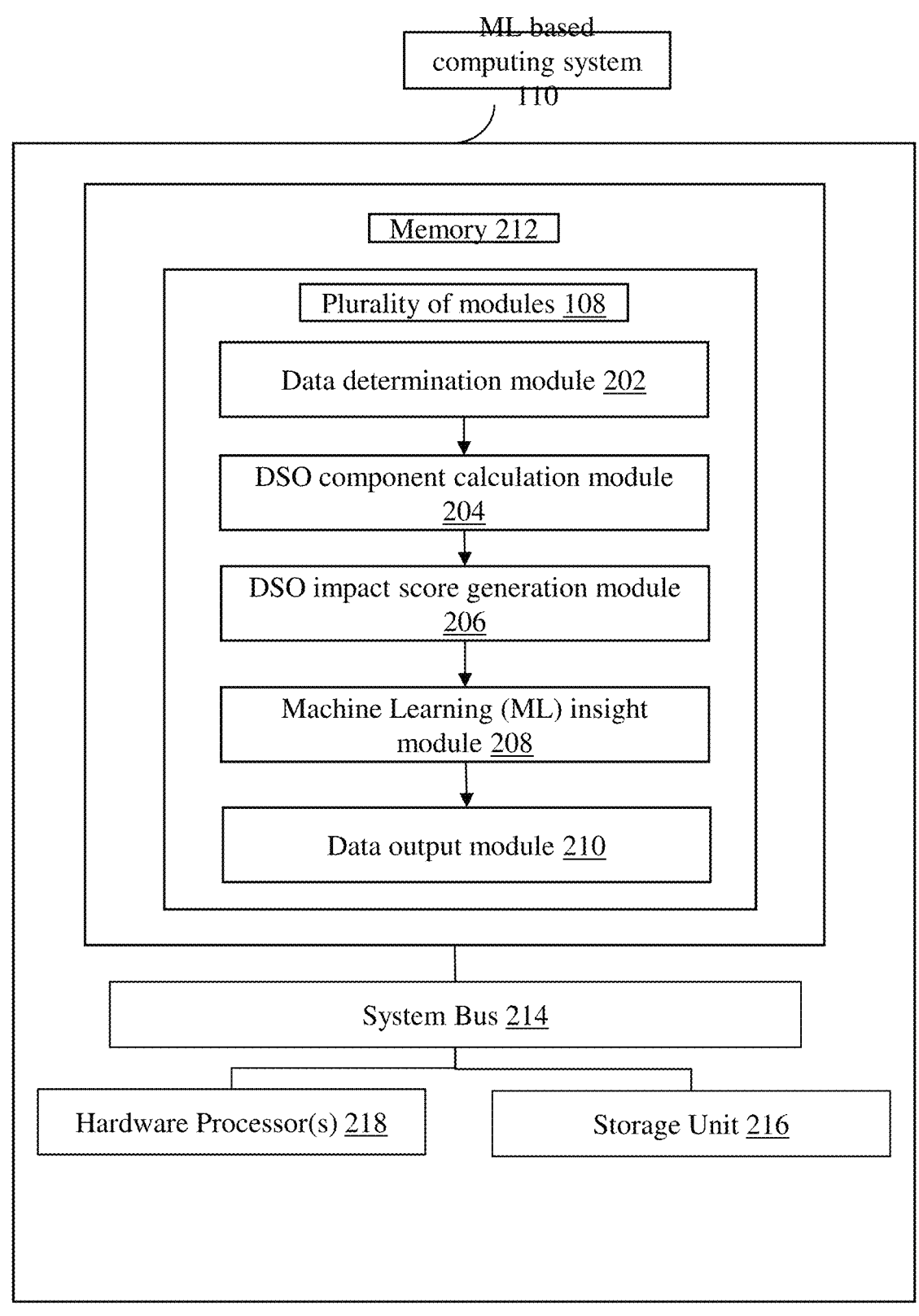
FIG. 2 is a block diagram illustrating an exemplary Machine Learning (ML)-based system for generation of DSO impact score, in accordance with an embodiment of the present disclosure.

FIG. 2 is a block diagram illustrating an exemplary Machine Learning (ML)-based computing system for generation of DSO impact score, in accordance with an embodiment of the present disclosure. Further, the ML-based computing system 110 includes the plurality of modules 108, a memory 212, a system bus 214, a storage unit 216 and one or more hardware processors 218.

The memory 212 comprises the plurality of modules 108 in the form of programmable instructions executable by the one or more hardware processors 218. Further, the plurality of modules 108 includes a data determination module 202, a DSO component calculation module 204, a DSO impact score generation module 206, an Artificial Intelligence (AI) insight module 208 and a data output module 210.

The one or more hardware processors 218, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 218 may also include embedded controllers, such as generic or programmable logic devices or arrays, application specific integrated circuits, single-chip computers, and the like.

The memory 212 may be non-transitory volatile memory and non-volatile memory. The memory 212 may be coupled for communication with the one or more hardware processors 218, such as being a computer-readable storage medium. The one or more hardware processors 218 may execute machine-readable instructions and/or source code stored in the memory 212. A variety of machine-readable instructions may be stored in and accessed from the memory 212. The memory 212 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 212 includes the plurality of modules 108 stored in the form of machine-readable instructions on any of the above-mentioned storage media and may be in communication with and executed by the one or more hardware processors 218.

The storage unit 216 may be a cloud storage, or a location on a file system directly accessible by the plurality of modules 108. The storage unit 216 may store the DSO impact scores.

The data determination module 202 is configured to obtain a credit sale amount, an account receivable as of the run date of the module (RD), a disputed invoice amount, a skipped invoice amount and Predicted Invoice Payment Date using a Machine Learning based computing system. An exemplary embodiment of the Machine Learning Module for predicting payment is provided in co-pending patent application Ser. No. 18/305,483 filed on Apr. 24, 2023, entitled "MACHINE LEARNING (ML)-BASED SYSTEM AND METHOD FOR PREDICTING FINANCIAL TRANSACTION PATTERNS", filed by HighRadius Corporation. The ML based computing system is used to predict the Payment Date of one or more open invoices. The one or more open invoices uses historical closed invoice data as train data. The Machine Learning module dynamically generates a plurality of possible payment patterns based on the historical payment frequency of customers and evaluates the customers' adherence to the dynamically generated patterns and selects the pattern with highest adherence historically for each customer. The Machine Learning module further maps the selected payment patterns for all customers to their corresponding one or more open invoices to generate the final payment date prediction of the one or more open invoices. The credit sale amount refers to a sale in which the amount owed will be paid later. The account receivable as of RD is a payment received from customers for purchased goods and services on credit. The disputed invoice amount is the total amount of invoices which are under dispute. The skipped invoice amount is the total amount of invoices the payments for the invoices which are skipped due to some accidental lag in process.

The DSO component calculation module 204 is configured to calculate the DSO components for each entity corresponding to a grouping category at a given point of time period based on the obtained credit sale, the accounts receivable as of the run date (RD), the disputed invoice amount and the skipped invoice amount.

In an embodiment, the calculation of the DSO component is as follows—

$$\text{DSO=number of days } X \text{ (account receivable as of run dateend for given period credit sales in period)} \qquad \text{equation (1)}$$

In an alternate embodiment, following is the equation (2) for calculating the credit sale, $$\text{Credit sale amount=sum of all dates where (posting date run date number of days–number of days in period) AND (ClearingDate>PostingDate)} \qquad \text{equation (2)}$$

In an alternate embodiment, following is the equation (3) for calculating the accounts receivable as of RD.

$$\text{Accounts receivable as of run date=open amount not yet due+invoice amount past due and not disputed and not skipped+disputed invoice amount+skipped invoice amount} \qquad \text{equation (3)}$$

Disputed Invoice Amount is the total amount of invoices that are under a dispute. Skipped Invoice Amount is the total amount of invoices, the payments for which got skipped due to some accidental lag in process.

In an embodiment, the open amount reduction, i.e., the amount that is going to get collected within the horizon, is estimated within 7, 14 and 21 days, if the one or more users collect the cash based on either of the following two exemplary embodiments.

The first exemplary embodiment is to continue the collections processes with the current as-is approach. The open amount reduction in this embodiment can be estimated by adding up the amount of all the open invoices predicted to be paid in the horizon under observation.

The second exemplary embodiment is to collect all the amount that lies in at least one of the following three categories: Past Due Invoice Amount, Skipped Invoice Amount and Open Amount about to be due within the horizon under observation.

In an embodiment, the following is the equation (4) used for calculating the account level DSO impact for any entity grouping level. An entity grouping level can be at customer level, company code or business unit level, and the like.

$$\text{Account level DSO=days in period×(open amount reduction using present process on the grouping level–open amount reduction based on the conventional grouping level/credit sales of group in the period)} \qquad \text{equation (4)}$$

The DSO component calculation module 204 is further configured to estimate an open amount reduction of the calculated DSO component based on a payment date. The payment date is generated based on historical closed invoice data. The payment date is predicted based on the historical customer information. The ML Module is used to predict the payment date of one or more open invoices. The one or more open invoices uses historical closed invoice data as train data. The ML Module dynamically generates a plurality of possible payment patterns based on the historical payment frequency of customers and evaluates the customers' adherence to the dynamically generated patterns and selects the patterns with highest adherence historically, for each customer. The ML Module further maps the selected payment patterns for all customers to their corresponding one or more open invoices to generate the final payment date prediction of the one or more open invoices. The open amount reduction is calculated by adding up the amounts of open Invoices predicted to be paid within the horizon under observation.

The DSO impact score generation module 206 is configured to generate a DSO impact score based on the estimated open amount reduction, desired number of days in period and the credit sale amount using one or more Machine Learning models.

In an alternative embodiment, the ML-based model used for predicting the DSO impact score in the DSO impact score generation module 206 uses a regression-based ML-model.

In another embodiment, the regression-based ML-model may include one or more of simple linear regression model, multiple linear regression model, polynomial regression model, support vector regression model, decision tree regression model, random forest regression model and the like.

In another embodiment, the regression-based ML-model may include light gradient boost machine (Light GBM), extreme gradient boost (XGBoost), categorical boosting (Cat boost) and the like.

The extreme gradient boost (XGBoost), the categorical boosting (Cat boost), and the light gradient boost machine (Light GBM) are well-known technologies, and thus detailed description thereof is omitted.

In one embodiment, the Light GBM model is used for predicting the DSO Impact Score. Light GBM is a gradient boosting framework that uses tree-based learning algorithms for regression tasks. It is designed to be efficient and scalable, particularly for datasets with a large number of features. In a regression analysis, the Light GBM model tries to predict a continuous target variable based on a set of input features. The model uses a set of decision trees to make these predictions, where each tree is built to correct the errors of the previous trees. The final prediction is obtained by taking a weighted average of the predictions from all the trees.

In one embodiment, the DSO impact score generation module 206 uses a Light GBM model to predict DSO Impact Score. The DSO Impact Score indicates the potential impact of DSO reduction on open invoices.

The input for the DSO impact score generation module 206 includes one or more of parameters, including estimated open amount reduction, desired number of days in period and the credit sale amount. In one embodiment, the inputs for the DSO impact score generation module 206 is the output of the DSO component calculation module 204.

In another embodiment, the data is pre-processed to ensure that it is in a suitable format for input into the Light GBM regression model.

In one non-limiting embodiment, the Light GBM regression model is trained using the pre-processed input data to predict the DSO Impact Score. The model uses a set of decision trees to make these predictions, where each tree is built to correct the errors of the previous trees. The final prediction is obtained by taking a weighted average of the predictions from all the trees.

The Light GBM regression model predicted DSO Impact Score transmitted to the data output module 210, which is configured to output the DSO Impact Score on a user interface screen of one or more electronic devices associated with a user.

In one embodiment, the XGBoost model is used for predicting the DSO Impact Score. XGBoost is an open-source library that provides an efficient and effective implementation of the gradient boosting algorithm for regression problems. Gradient boosting is a technique that builds an ensemble of decision trees, where each tree tries to correct the errors made by the previous ones. XGBoost uses objective functions that contain a loss function and a regularization term to prevent overfitting. It also uses various optimization techniques such as parallelization, tree pruning, and handling of missing values. XGBoost can be used for regression problems by specifying the appropriate objective function for mean squared error and root mean squared error.

In one embodiment, the DSO impact score generation module 206 uses a XGBoost model to predict DSO Impact Score. The DSO Impact Score comprises an estimated date at which the one or more customers and the one or more vendors complete a financial transaction to clear the set of open invoices.

The input for the DSO impact score generation module 206 includes one or more of parameters, including estimated open amount reduction, desired number of days in period and the credit sale amount. In one embodiment, the inputs for the DSO impact score generation module 206 is the output of the DSO component calculation module 204.

In another embodiment, the data is pre-processed to ensure that it is in a suitable format for input into the XGBoost regression model.

In one non-limiting embodiment, the XGBoost regression model is trained using the pre-processed input data to predict the DSO Impact Score. The model uses a set of decision trees to make these predictions, where each tree is built to correct the errors of the previous trees. The final prediction is obtained by taking a weighted average of the predictions from all the trees. XGBoost uses objective functions that contain a loss function and a regularization term to prevent overfitting.

The XGBoost regression model predicted DSO Impact Score transmitted to the data output module 210, which is configured to output the DSO Impact Score on a user interface screen of one or more electronic devices associated with a user.

In one embodiment, the CatBoost model is used for predicting the DSO Impact Score. CatBoost is an open-source library that provides an efficient and effective implementation of the gradient boosting algorithm for regression problems. CatBoost stands for Categorical Boosting, as one of its main features is its ability to handle categorical data without requiring extensive preprocessing. CatBoost uses a novel algorithm called Ordered Target Statistics to encode categorical features in a way that reduces overfitting and improves prediction accuracy. CatBoost builds an ensemble of decision trees, where each tree tries to correct the errors made by the previous ones. CatBoost uses a specific objective function that contains a loss function and a regularization term to prevent overfitting. CatBoost also uses various optimization techniques, such as parallelization, tree pruning, and handling of missing values.

CatBoost can be used for regression problems by specifying the appropriate objective function (such as RMSE for root mean squared error) and evaluation metric (such as R2 for coefficient of determination). CatBoost also supports various hyperparameters that can be tuned to improve the model performance, such as iterations, depth, learning rate etc.

In one embodiment, the DSO impact score generation module 206 uses a CatBoost model to predict DSO Impact Score. The DSO Impact Score comprises an estimated date at which the one or more customers and the one or more vendors complete a financial transaction to clear the set of open invoices.

The input for the DSO impact score generation module 206 includes one or more of parameters, including estimated open amount reduction, desired number of days in period and the credit sale amount. In one embodiment, the inputs for the DSO impact score generation module 206 is the output of the DSO component calculation module 204.

In another embodiment, the data is pre-processed to ensure that it is in a suitable format for input into the CatBoost regression model.

In one non-limiting embodiment, the CatBoost regression model is trained using the pre-processed input data to predict the DSO Impact Score. The model uses a set of decision trees to make these predictions, where each tree is built to correct the errors of the previous trees. The final prediction is obtained by taking a weighted average of the predictions from all the trees. CatBoost uses objective functions that contain a loss function and a regularization term to prevent overfitting.

The CatBoost regression model predicted DSO Impact Score transmitted to the Data output module 210, which is configured to output the DSO Impact Score on a user interface screen of one or more electronic devices associated with a user.

The Machine Learning insight module 208 is configured to highlight key pain points, and an operational efficiency for the generated DSO impact score based on the ML module. The DSO impact score indicates a potential impact on the customer level. The high DSO Impact score for any entity indicates poor collections process or poor customer payment behaviour. Pain points are identified by targeting the high DSO Impact score entities and identifying the category of amount which is causing the high DSO Impact score. It can be any and all of the following: High Past Due Amount, High Skipped Amount, Very Late Payments, and the like.

The Machine Learning insight module 208 is further configured to rank each of the one or more customers based on the generated key pain points, the operational efficiency and the collection strategy.

In an alternative embodiment, the ML-based model used for recommending key pain points, the operational efficiency and the collection strategy for each customer in the Machine Learning based Machine Learning Insight Module 208 uses a clustering-based ML-model. The customers are clustered based on the output of the DSO Impact Score Generation Module 206, and key pain points, the operational efficiency and the collection strategy are recommended for each customer cluster.

In another embodiment, the clustering-based ML-model may include one or more of logistic regression, k-Nearest Neighbours, Support Vector Machines, Kernel SVM, Naïve Bayes model, Decision Tree Classification, Random Forest Classification and the like.

In another embodiment, the clustering-based ML-model may include K-means model, DBSCAN model, HDBSCAN model, k-medoids algorithm and the like.

The K-means model, DBSCAN model, HDBSCAN model, k-medoids model are well-known technologies, and thus detailed description thereof is omitted.

In one embodiment, the K-means model is used for determining payment behavior and customer risk for each customer. K-means works by grouping similar data points into clusters based on their distances from each other. K-means does not require any labels or outcomes for the data. K-means works by randomly choosing k points as the initial cluster centers, where k is the number of clusters specified by the user. Then, it assigns each data point to the nearest cluster center based on some distance measure, such as Euclidean distance. Next, it updates the cluster centers by taking the average of all the data points assigned to each cluster. This process is repeated until the cluster centers do not change significantly or a maximum number of iterations is reached.

In one embodiment, the Machine Learning Insight Module 208 uses a k-means model for recommending key pain points, the operational efficiency and the collection strategy for each customer.

The input for the Machine Learning Insight Module 208 includes DSO Impact Score. In one embodiment, the inputs for the Machine Learning Insight Module 208 are the output of DSO Impact Score Generation Module 206.

In another embodiment, the data is pre-processed to ensure that it is in a suitable format for input into the K-means model clustering model.

In one non-limiting embodiment, the K-means model is trained using the pre-processed input data for recommending key pain points, the operational efficiency and the collection strategy for each customer.

The results of the K-means model are transmitted to the Data Output Module 210, which is configured to output the key pain points, the operational efficiency and the collection strategy for each customer on a user interface screen of one or more electronic devices associated with a user.

In one embodiment, the DBSCAN model is used for determining payment behavior and customer risk for each customer. DBSCAN is a model in which data points are grouped based on their density, that is, the number of data points in their neighborhood. It is especially useful for datasets that have outliers.

DBSCAN works by defining two parameters: eps and min_samples. Eps is the maximum distance between two data points to be considered as neighbors. Min_samples is the minimum number of data points required to form a dense region. DBSCAN then classifies each data point into one of three types: core, border, or noise. A core point is a point that has at least min_samples points within eps distance. A border point is a point that has fewer than min_samples points within eps distance, but is reachable from a core point. A noise point is a point that is neither a core nor a border point.

DBSCAN then forms clusters by connecting core points that are within eps distance of each other. Border points are assigned to the cluster of their nearest core point. Noise points are not assigned to any cluster. DBSCAN can find clusters of any shape and size, and can also identify outliers as noise points.

In one embodiment, the Machine Learning Insight Module 208 uses a DBSCAN model for recommending key pain points, the operational efficiency and the collection strategy for each customer.

The input for the Machine Learning Insight Module 208 includes DSO Impact Score. In one embodiment, the inputs for the Machine Learning Insight Module 208 are the output of DSO Impact Score Generation Module 206.

In another embodiment, the data is pre-processed to ensure that it is in a suitable format for input into the DBSCAN model clustering model.

In one non-limiting embodiment, the DBSCAN model is trained using the pre-processed input data for recommending key pain points, the operational efficiency and the collection strategy for each customer.

The results of the DBSCAN model are transmitted to the Data Output Module 210, which is configured to output the key pain points, the operational efficiency and the collection strategy for each customer on a user interface screen of one or more electronic devices associated with a user.

In one embodiment, the HDBSCAN model is used for determining payment behavior and customer risk for each customer. HDBSCAN is a model in which data points are grouped based on their density and hierarchy. It is an extension of DBSCAN that can handle clusters of varying densities and shapes. It is one of the most advanced and robust unsupervised machine learning algorithms for clustering, especially for data that has noise or outliers.

HDBSCAN works by first applying DBSCAN with a very small eps value to obtain a hierarchy of clusters. Then, it uses a technique called cluster stability to extract a flat clustering from the hierarchy. Cluster stability is a measure of how persistent a cluster is over different eps values. The more stable a cluster is, the more likely it is to be a meaningful cluster. HDBSCAN selects the most stable clusters and assigns each data point to one of them or to noise.

HDBSCAN can also provide soft clustering, which represents the degree of membership of each data point to each cluster. This is useful for data that has overlapping or fuzzy clusters. HDBSCAN computes the soft clustering by using the probability of each data point belonging to each cluster at different eps values.

In one embodiment, the Machine Learning Insight Module 208 uses a HDBSCAN model for recommending key pain points, the operational efficiency and the collection strategy for each customer.

The input for the Machine Learning Insight Module 208 includes DSO Impact Score. In one embodiment, the inputs for the Machine Learning Insight Module 208 are the output of DSO Impact Score Generation Module 206.

In another embodiment, the data is pre-processed to ensure that it is in a suitable format for input into the HDBSCAN model clustering model.

In one non-limiting embodiment, the HDBSCAN model is trained using the pre-processed input data for recommending key pain points, the operational efficiency and the collection strategy for each customer.

The results of the HDBSCAN model are transmitted to the Data Output Module 210, which is configured to output the key pain points, the operational efficiency and the collection strategy for each customer on a user interface screen of one or more electronic devices associated with a user.

In one embodiment, the K-medoids model is used for determining payment behavior and customer risk for each customer. K-medoids is a technique in which we group data points into k clusters based on their similarity to some representative points. It is a variation of k-means clustering that uses actual data points as cluster centers instead of the mean of each cluster. It is also known as the Partitioning Around Medoids (PAM) algorithm.

K-medoids work by randomly choosing k data points as the initial medoids, where k is the number of clusters specified by the user. Then, it assigns each data point to the nearest medoid based on some distance measure, such as Euclidean distance. Next, it updates the medoids by swapping each medoid with a non-medoid data point and computing the total cost of the clustering. The cost is the sum of the distances between each data point and its nearest medoid. The swap that produces the lowest cost is accepted. This process is repeated until no more swaps can lower the cost.

In one embodiment, the Machine Learning Insight Module 208 uses a K-medoids model for recommending key pain points, the operational efficiency and the collection strategy for each customer.

The input for the Machine Learning Insight Module 208 includes DSO Impact Score. In one embodiment, the inputs for the Machine Learning Insight Module 208 are the output of DSO Impact Score Generation Module 206.

In another embodiment, the data is pre-processed to ensure that it is in a suitable format for input into the K-medoids model model.

In one non-limiting embodiment, the K-medoids model is trained using the pre-processed input data for recommending key pain points, the operational efficiency and the collection strategy for each customer.

The results of the K-medoids model are transmitted to the Data Output Module 210, which is configured to output the key pain points, the operational efficiency and the collection strategy for each customer on a user interface screen of one or more electronic devices associated with a user.

The data output module 210 is configured to output the DSO impact score, the key pain points, the operational efficiency, the collection strategy and the ranked customer on a user interface of one or more electronic devices 102 associated with a user.

FIG. 3 is an example illustrating a sample customer level grouping process 300, in accordance with an embodiment of the present disclosure. According to FIG. 3, the open amount reduction in the desired time period is estimated in 7, 14 and 21 days. The present invention makes use of the predicted payment date generated based on the historical customer information. Further, the estimation of the open amount reduction is continued to follow the customer behaviour for 7, 14 and 21 days. Based on this, the expected open amount is paid within the 7, 14 and 21 days on the selected grouping level.

Figure 4:
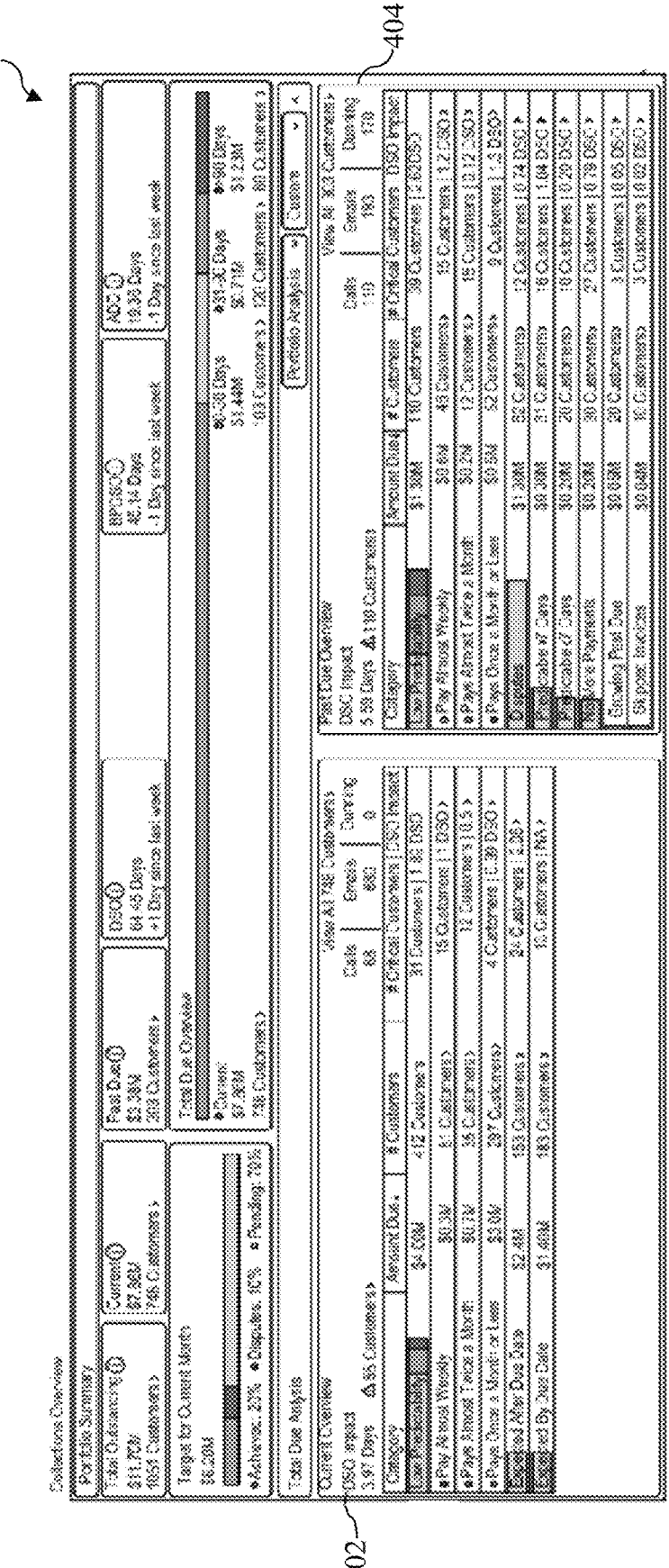
FIG. 4 is a graphical representation illustrating an exemplary summary view of the total due analysis of the DSO, in accordance with an embodiment of the present disclosure.

FIG. 4 is a graphical representation illustrating an exemplary summary view 400 of the total due analysis of the DSO, in accordance with an embodiment of the present disclosure. According to FIG. 4, the summary view of the payment behaviour based customer segment is generated. The summary view of each payment behaviour based customer segment comprises total outstanding amount, current amount 402, past due amount 404, Days Sale Outstanding (DSO), BPDSO, target for current month, total due overview, total due analysis and DSO impacts.

FIG. 5 is a flow chart illustrating an exemplary Machine Learning (ML)-based computing method for generation of DSO impact score for financial transactions, in accordance with an embodiment of the present disclosure. According to FIG. 5, at step 502, the credit sales, account receivable as of RD, disputed invoice amount and skipped invoice amount are obtained using the Machine Learning Module.

At step 504, the DSO components are calculated for each entity corresponding to a grouping category at a given point of time period. The calculated DSO components are based on the obtained credit sale, the accounts receivable as of the run date of the module (RD), the disputed invoice amount and the skipped invoice amount.

At step 506, the open amount reduction of the calculated DSO is estimated based on the predicated payment date. The predicted payment date is generated based on the historical customer information.

At step 508, the DSO impact score is generated based on the estimated open amount reduction, desired number of days in period and the credit sale amount using the ML module.

At step 510, the key pain points, the operational efficiency and the collection strategy for the calculated DSO impact score are recommended based on the ML module. The DSO impact score indicates a potential impact on customer level.

At step 512, each of the one or more customers are ranked based on the recommended key pain points, the operational efficiency and the collection strategy.

At step 514, the DSO impact score, the key pain points, the operational efficiency, the collection strategy and the ranked customer are outputted on the user interface of the one or more electronic devices 102 associated with the user.

In an embodiment, the estimating of the open amount reduction based on the desired number of days. The desired number of days includes 7, 14 and 21 days. The open amount reduction includes past due invoice amount, not skipped invoice, not disputed invoice, skipped amount and open amount due within the desired number of days.

In an embodiment, the calculated DSO impact score is compared with the desired grouping level. The desired grouping level comprises one or more customers, payment terms, invoice type, product type. The potential impact is generated and the generated potential impact on the customer level DSO is highlighted.

In an embodiment, the calculated grouping level DSO impact corresponds to the desired days in period, open amount reduction on the grouping level and credit sales of the group in a period.

In an embodiment, the calculated account level DSO impact corresponds to the desired days in period, open amount reduction on the grouping level and overall credit sales in the period.

In an embodiment, the summary view of the payment behaviour based customer segment is generated. The summary view of each payment behaviour based customer segment comprises total outstanding amount, current amount, past due amount, Days Sale Outstanding (DSO). BPDSO, target for current month, total due overview, total due analysis and DSO impacts.

In an embodiment of the present invention, the present invention provides assessment of sub-group and entity level impact on key metrics, including, but not limited to DSO. DSO percentage, past due, current amount past due, current amount. The key metrics further determine the operational efficiency of the collection of the entity. The present invention identifies key pain points and hindrances in the way of process optimization and comes up with insight driven collections strategy.

In an embodiment of the present invention, the present invention provides high DSO reduction. On the average across different types of business, DSO reduction of 5% is estimated on using the present invention.

In certain embodiments, the invention provides a method for dynamically updating the ML based computing system and re-train the system. The method comprises: monitoring the performance of the machine learning model in real time; identifying instances where the performance of the ML-based computing system falls below a predetermined threshold: automatically generating new training data based on the identified instances; and retraining the machine learning model using the new training data.

As the ML based computing system is retrained, the system becomes more proficient in generating Days Sales Outstanding (DSO) impact score and recommending key pain points, an operational efficiency and a collection strategy for the generated DSO impact score. This results in significant benefits for both the processing hardware (e.g., servers) and the overall decision-making process. The continuous improvement in accuracy and efficiency, facilitated by the ongoing updates to the machine learning model, leads to tangible gains in performance. This not only optimizes the use of processing hardware but also reduces the number of incorrect predictions. By streamlining the system in this manner, the invention provides a more robust and reliable solution for generating Days Sales Outstanding (DSO) impact score.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 214 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

What is claimed is:

1. A Machine Learning (ML) based computing method for generating Days Sales Outstanding (DSO) impact score, the ML-based computing method comprising:

obtaining, by one or more hardware processors, a credit sale amount, an account receivable as of a run date (RD), a disputed invoice amount and a skipped invoice amount and a predicted invoice payment date using a Machine Learning based computing system;

calculating, by the one or more hardware processors, a DSO component for each entity corresponding to a grouping category at given point of time period based on the obtained credit sale amount, the account receivable as of the run date (RD), the disputed invoice amount and the skipped invoice amount;

estimating, by the one or more hardware processors, an open amount reduction for the calculated DSO component based on a payment date, wherein the payment date is generated based on a historical customer information;

generating, by the one or more hardware processors, a DSO impact score based on the estimated open amount reduction, desired number of days in period and the credit sale amount, by using a machine learning model, wherein the machine learning model is a regression-based machine learning model configured to:

pre-processing input parameters comprising the estimated open amount reduction, the desired number of days in the period, and the credit sale amount to obtain formatted input data for the regression-based machine learning model;

training the regression-based machine learning model using the formatted input data, wherein the regression-based machine learning model comprises an iteratively generated ensemble of decision trees configured to correct errors of preceding decision trees;

applying the trained regression-based machine learning model to new input parameters comprising the estimated open amount reduction, the desired number of days in the period, and the credit sale amount to obtain intermediate predictions from the decision trees; and calculating the weighted average of the intermediate predictions of the decision tree, and generating the DSO impact score based on the calculated weighted average;

recommending, by the one or more hardware processors, key pain points, an operational efficiency and a collection strategy for the generated DSO impact score based on a Machine Learning module, wherein the DSO impact score indicates a potential impact on overall and customer level, wherein the machine learning module uses a clustering-based machine learning model;

ranking, by the one or more hardware processors, each of the one or more customers based on the generated key pain points, the operational efficiency and the collection strategy, and outputting, by the one or more hardware processors, the DSO impact score, the key pain points, the operational efficiency, the collection strategy and the ranked customer on a user interface of one or more electronic devices associated with a user.

2. The ML-based computing method of claim 1, further comprising estimating the open amount reduction based on the desired number of days, wherein the open amount reduction includes past due invoice amount, not skipped invoice, not disputed invoice, skipped amount and open amount due within the desired number of days.

3. The ML-based computing method of claim 1, further comprising:

comparing the generated DSO impact score with a desired grouping level, wherein the desired grouping level comprises one or more customer, payment terms, invoice type, product type; and generating the potential impact and highlighting the generated potential impact on the customer level DSO.

4. The ML-based computing method of claim 1, wherein the calculated DSO component corresponds to a grouping level DSO impact and wherein the grouping level DSO impact comprises desired days in period, open amount reduction on the grouping level and credit sales of group in a period.

5. The ML-based computing method of claim 1, wherein the calculated DSO component corresponds to an account level DSO impact and wherein the account level DSO impact comprises desired days in period, open amount reduction on the grouping level and overall credit sales in the period.

6. The ML-based computing method of claim 1, wherein ranking each of the one or more customers based on the generated DSO impact score, the key pain points, the operational efficiency and the collection strategy, the method comprising:

generating a summary view of the payment behaviour based customer segment, wherein the summary view of the each payment behaviour based customer segment comprises total outstanding amount, current amount, past due amount, Days Sale Outstanding (DSO), BPDSO, target for current month, total due overview, total due analysis and DSO impacts.

7. A Machine Learning (ML) based computing system for generating financial transaction based Days Sales Outstanding (DSO) component, the ML-based computing system comprises:

one or more hardware processors;

a memory coupled to the one or more hardware processors, wherein the memory comprises a plurality of modules in the form of programmable instructions executable by the one or more hardware processors, and wherein the plurality of modules comprises:

a data determination module configured to obtain a credit sale amount, an account receivable as of a run date (RD), a disputed invoice amount and a skipped invoice amount using an Machine Learning (ML) module;

a DSO component calculation module configured to:

calculate a DSO component for each entity corresponding to a grouping category at given point of time period based on the obtained credit sale amount, the account receivable as of the run date (RD), the disputed invoice amount and the skipped invoice amount;

estimate an open reduction for the calculated DSO component based on a payment date, wherein the payment date is generated based on a historical customer information;

a DSO impact score generation module configured to generate a DSO impact score based on the estimated open amount reduction, desired number of days in period and the credit sale amount, by using a machine learning model;

wherein the machine learning model is a regression-based machine learning model configured to:

pre-process input parameters comprising the estimated open amount reduction, the desired number of days in the period, and the credit sale amount to obtain formatted input data for the regression-based machine learning model;

train the regression-based machine learning model using the formatted input data, wherein the regression-based machine learning model comprises an iteratively generated ensemble of decision trees configured to correct errors of preceding decision trees;

apply the trained regression-based machine learning model to new input parameters comprising the estimated open amount reduction, the desired number of days in the period, and the credit sale amount to obtain intermediate predictions from the decision trees;

calculate the weighted average of the intermediate predictions of the decision trees; and generate the DSO impact score based on the calculated weighted average:

an Machine Learning insight generation module configured to:

recommend key pain points, an operational efficiency and a collection strategy for the generated DSO impact score based on a machine learning module, wherein the DSO impact score indicated a potential impact on customer level, wherein the machine learning module uses a clustering-based machine learning model;

rank each of the one or more customers based on the generated DSO impact score, recommended key pain points, the operational efficiency and the collection strategy, and a data output module configured to output the DSO impact score, key pain points, the operational efficiency, the collection strategy and the ranked customer on a user interface of one or more electronic devices associated with a user.

8. The ML-based computing system of claim 7, further comprises:

estimate the open amount reduction based on the desired number of days, wherein the open amount reduction comprises past due invoice amount, un-skipped invoice, undisputed invoice, skipped amount and open amount due within the desired number of days.

9. The ML-based computing system of claim 7, further comprises:

comparing the generated DSO impact score with a desired grouping level, wherein the desired grouping level comprises one or more customer, payment terms, invoice type, product type; and generating the potential impact and highlighting the generated potential impact on the customer level DSO.

10. The ML-based computing system of claim 7, wherein the calculated DSO component corresponds to a grouping level DSO impact and wherein the grouping level DSO impact comprises desired days in period, open amount reduction on the grouping level and credit sales of group in a period.

11. The ML-based computing system of claim 7, wherein the calculated DSO component corresponds to an account level DSO impact and wherein the account level DSO impact comprises desired days in period, open amount reduction on the grouping level and overall credit sales in the period.

12. The ML-based computing system of claim 7, wherein in ranking each of the one or more customers based on the generated DSO impact score, the key pain points, the operational efficiency and the collection strategy, the DSO calculation module is configured to:

generate a summary view of the payment behaviour based customer segment, wherein the summary view of the each payment behaviour based customer segment comprises total outstanding amount, current amount, past due amount, Days Sale Outstanding (DSO), BPDSO, target for current month total due overview, total due analysis and DSO impacts.

13. The ML based computing system of claim 7, wherein the computing system is further configured to:

monitor performance of the ML-based computing system in real time; identify instances where the performance of the ML-based computing system falls below a predetermined threshold;

automatically generate new training data based on the identified instances; and retrain the machine learning module using the new training data.

14. A non-transitory computer-readable storage medium having instructions stored therein that when executed by a hardware processor, cause the processor to execute operations of:

obtaining a credit sale amount, an account receivable as of a run date (RD), a disputed invoice amount and a skipped invoice amount and Predicted Invoice Payment Date using a Machine Learning based computing system;

calculating a DSO component for each entity corresponding to a grouping category at given point of time period based on the obtained credit sale amount, the account receivable as of the run date (RD), the disputed invoice amount and the skipped invoice amount;

estimating an open amount reduction for the calculated DSO component based on a payment date wherein the payment date is generated based on a historical customer information;

generating a DSO impact score based on the estimated open amount reduction, desired number of days in period and the credit sale amount, by using a machine learning model, wherein the machine learning model is a regression-based machine learning model configured to:

pre-processing input parameters comprising the estimated open amount reduction, the desired number of days in the period, and the credit sale amount to obtain formatted input data for the regression-based machine learning model;

training the regression-based machine learning model using the formatted input data, wherein the regression-based machine learning model comprises an iteratively generated ensemble of decision trees configured to correct errors of preceding decision trees:

applying the trained regression-based machine learning model to new input parameters comprising the estimated open amount reduction, the desired number of days in the period, and the credit sale amount to obtain intermediate predictions from the decision trees; and calculating the weighted average of the intermediate predictions of the decision tree, and generating the DSO impact score based on the calculated weighted average:

recommending key pain points, an operational efficiency and a collection strategy for the generated DSO impact score based on a machine learning module, wherein the DSO impact score indicates a potential impact on overall and customer level, wherein the machine learning module uses a clustering-based machine learning model;

ranking each of the one or more customers based on the generated key pain points, the operational efficiency and the collection strategy; and outputting the DSO impact score, the key pain points, the operational efficiency, the collection strategy and the ranked customer on a user interface of one or more electronic devices associated with a user.

* * * * *